June 9, 1931.　　　　G. WALTHER　　　　1,809,655
METAL WHEEL
Filed Jan. 10, 1927　　　3 Sheets-Sheet 3

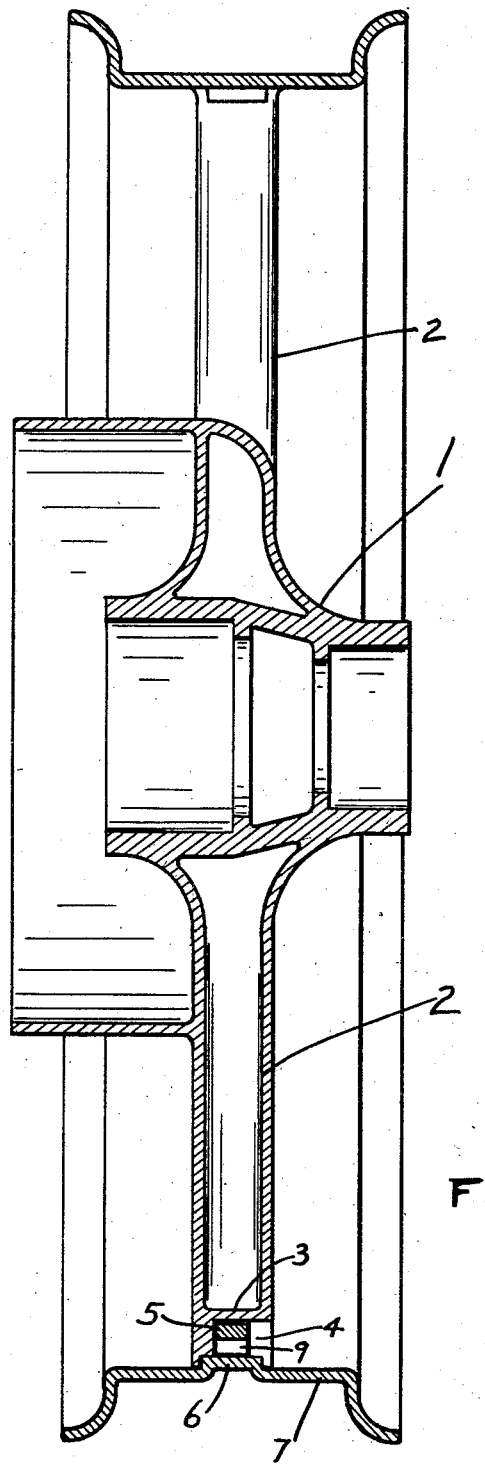
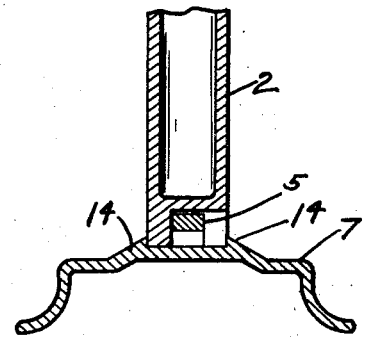
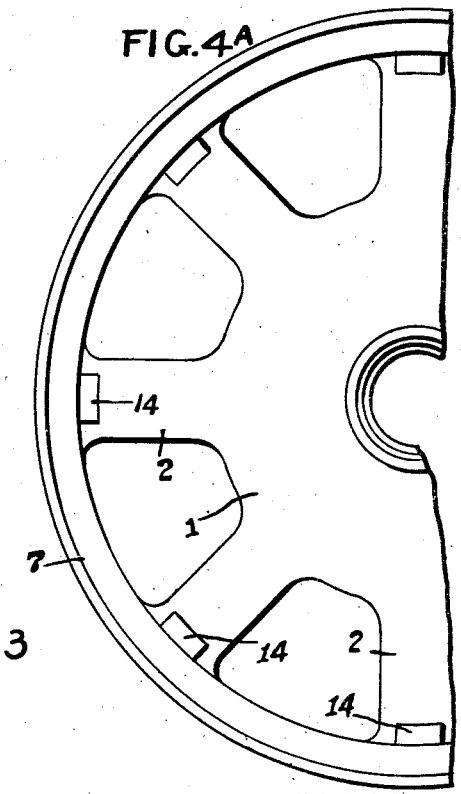

INVENTOR,
George Walther,
BY Howard P. Smith
His ATTORNEY.

Patented June 2, 1931

1,809,655

UNITED STATES PATENT OFFICE

GEORGE WALTHER, OF NEAR DAYTON, OHIO, ASSIGNOR TO THE DAYTON STEEL FOUNDRY COMPANY, A CORPORATION OF OHIO

METAL WHEEL

Application filed January 10, 1927. Serial No. 160,204.

This invention relates to new and useful improvements in metal wheels.

It is the principal object of my invention to provide a metal wheel having a spider on which an axially split rim may be easily and solidly mounted. To achieve this result my invention contemplates a tire rim formed with seats or pads circumferentially arranged around its inner periphery for engagement in circumferential grooves in the hollow spoke ends of the spider when the rim is turned. Or the same result may be achieved by providing parallel lugs upon the inner surface of the rim to be brought into positions to straddle the spoke ends when the rim is turned.

It is another object of the invention to provide plug means for entrance between the split ends of the rim to hold it expanded a slight degree when it is mounted on the spider, whereupon the plug may be withdrawn from said space to permit the rim to contract sufficiently to fit tightly and evenly around the spider.

It is still another object of my invention to employ the spacing means as a driver between the spoke which receives it and the rim.

My improved axial split rim and spider provide, when assembled, a light, attractive wheel which may be economically produced.

Other important and incidental objects will be brought out in the following specification and particularly pointed out in the subjoined claims.

Figure 1:
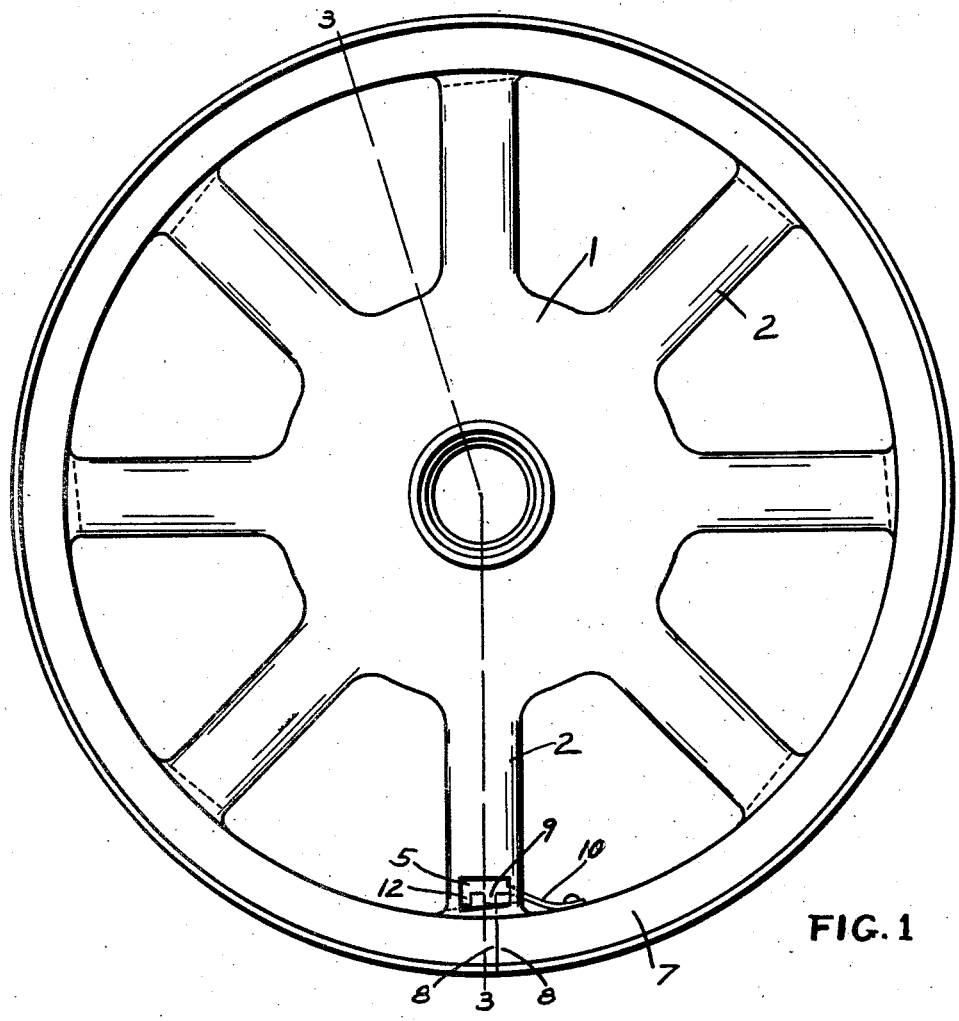
Figure 2:
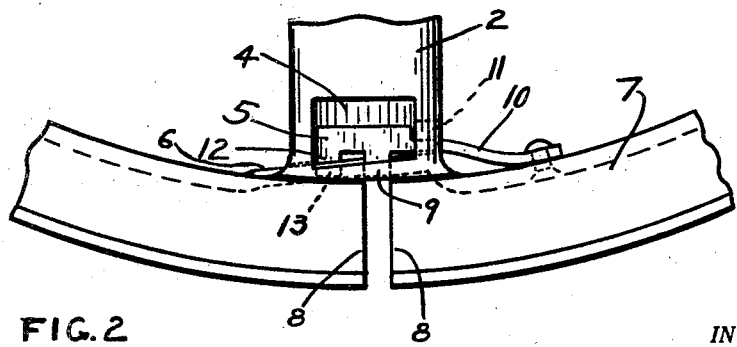
Figures 5, 6, 7:
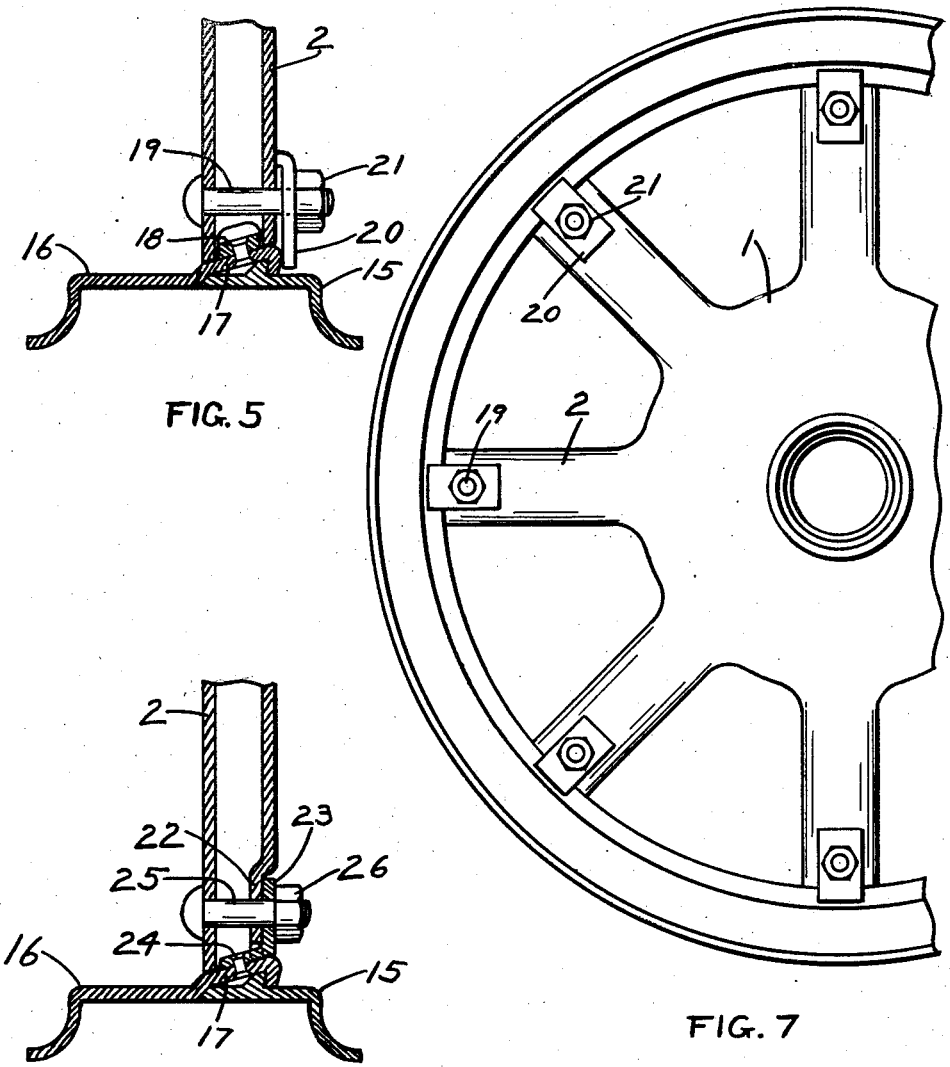

In the accompanying drawings illustrating my invention, Figure 1 is a rear elevational view of my improved metal wheel. Figure 2 is an enlarged partial view of the rim and a spoke end of the spider, showing the plug means for holding the split rim in an expanded position when it is being mounted on the spider. Figure 3 is a sectional view taken through my improved metal wheel on the line 3—3 of Figure 1, showing one of the tapered pads or seats on the rim within the circumferential groove on a spoke end. Figure 4 is a sectional view taken through a rim formed with parallel flanges to receive a spoke end of the spider. Figure 4A is a partial rear view of a wheel showing the parallel flanges at intervals, on the rim, to receive the spoke ends of the spider. Figure 5 is a sectional view taken through a metal wheel of this type, showing modified means for securing the rim upon the spider. Figure 6 is a sectional view taken through a metal wheel of this type, showing a slightly different form of clamping means for securing the rim upon the spider. And Figure 7 is a partial rear view of a metal wheel, provided with loose clamps for securing the rim to the spider.

Referring to the accompanying drawings for a detailed description of my invention, the numeral 1 designates the hub and 2 the spokes of a wheel spider that is cast from steel or other suitable material. Such a casting can be easily made in a foundry, thus reducing the cost of producing the wheel.

Referring to Figure 3, one spoke 2, which is hollow, is formed at its outer end with a web 3 which forms the bottom of a pocket 4 adapted to receive a spacing and driving plug 5 to be hereinafter described. The extreme outer ends of the spokes 2 are grooved in the direction of the circumference of the wheel to receive tapering pads or seats 6 arranged around the middle portion of the inner periphery of a rim 7. The latter is split axially, as shown in Figure 2, to receive between its meeting ends 8, 8 a projection 9 on the spacing plug 5.

The spacing plug 5 is carried by the inner end of a spring member 10 which, at its outer end, is riveted to the rim as shown in Figure 2. This spring member 10 projects through a slot 11 of sufficient width and depth in the spoke end to permit its free movement therein. The plug 5 is formed with a second projection 12 adapted to enter a hole 13 in the rim 7 to hold the latter in proper position until the rim is tight on the spider after the spacing projection 9 has been withdrawn from the space between the ends 8, 8 of the rim. (See Figures 1 and 2.)

When a tire (not shown) on the rim 7 is carried as a spare, the ends 8, 8 of the rim are held about one fourth of an inch apart by the projection 9 on the plug 5. When the rim is so expanded, it may be readily slipped upon the spider, after which said rim may be turned to bring the tapered pads 6 into the grooves in the outer ends of the spokes 2. After the pads are in their home positions within the grooves in the ends of the spokes, a suitable instrument may be inserted in the pocket 4, which is open to receive it, to raise the plug a sufficient distance into said pocket to withdraw the projections 9 and 12 from engagement with the rim. The latter will then contract to a tension hold upon the spider, and the plug will act as a driver between the spoke and the rim. (See Figures 1 and 3.)

In Figure 4 I have shown a rim formed with parallel flanges 14, 14 at intervals around its inner surface to be brought to positions to straddle the ends of the spokes 2 when said rim, in its expanded condition, is turned. The rim is then permitted to contract to a tension hold upon the spider by raising the plug 5 as before described.

In Figure 5 I have illustrated a form of loose clamping means for securing the tire rim to the spoke ends. In this instance the tire rim is made up of two interlocking sections 15 and 16, the latter section being formed with a beveled portion 17 upon which the spoke ends are formed to rest. Riveted to this beveled portion 17 of the tire section 16 is a locating lug which is received by each hollow spoke end. Through transverse holes formed in the spoke ends there are passed bolts 19 on whose outer ends are loose clamps 20. By nuts 21 on the threaded ends of the bolts, these clamps are pressed firmly against the spoke ends and the outer bent edges of the rim section 16 to tightly hold the rim on the spokes.

In Figure 6 I have illustrated a similar tire rim comprising interlocking sections 15 and 16. Upon the inner part of the beveled portion 17 of the tire rim section 16 one side of the spokes 2 rest, while the opposite part of each spoke has an inset end portion 22. The latter is engaged by the vertical part of an angle plate 23 whose foot portion is inclined for attachment by rivets 24 to the beveled portion 17 of the tire rim section 16. Through holes in each spoke end and in the vertical portion of the angle plate 23 there is passed a bolt 25 on whose outer threaded end there is a nut 26 for firmly drawing the angle plate or clamp against the inset portion 22 of the spoke. In this manner the rim will be solidly held upon the spokes.

Having described my invention, I claim:

1. A metal wheel comprising a spider made up of a hub and spokes, an axially split rim adapted to be mounted upon the spoke ends, one of said spoke ends formed with a pocket, and a plug radially movable in said pocket for engagement between the ends of the rim to hold it expanded until it is mounted in its home position upon the spider.

2. A metal wheel comprising a spider made up of a hub and spokes, an axially split rim adapted to be mounted upon the spoke ends, one of the latter being formed with a pocket, a spring member connected to the rim and projecting into the pocket, and a plug connected to the spring member within the pocket, said plug adapted to be inserted between the ends of the rim to hold it expanded until it is mounted in its home position upon the spider, after which said plug is adapted to be moved inwardly into the pocket a sufficient distance to clear the rim and act as a driver between it and the spoke through the spring member.

3. A metal wheel comprising a spider made up of a hub and spokes, an axially split rim adapted to be mounted upon the spoke ends, one of the latter being formed with a pocket, said rim being formed with a hole near one of its ends, and a plug in said pocket formed with two projections, one of which is adapted to be inserted between the ends of the tire rim and the other of which is adapted to enter the hole in the rim for the purpose specified.

4. A metal wheel comprising a spider made up of a hub and spokes, an axially split rim adapted to be mounted upon the spoke ends, and a member radially movable from a spoke end, to a position between the ends of the rim to hold it expanded until it is mounted in its home position upon the spider.

In testimony whereof I have hereunto set my hand this 5 day of January, 1927.

GEORGE WALTHER.